May 8, 1934.   C. L. KENNEDY   1,958,104
CONDENSER INDUCTION MOTOR
Filed Nov. 8, 1930
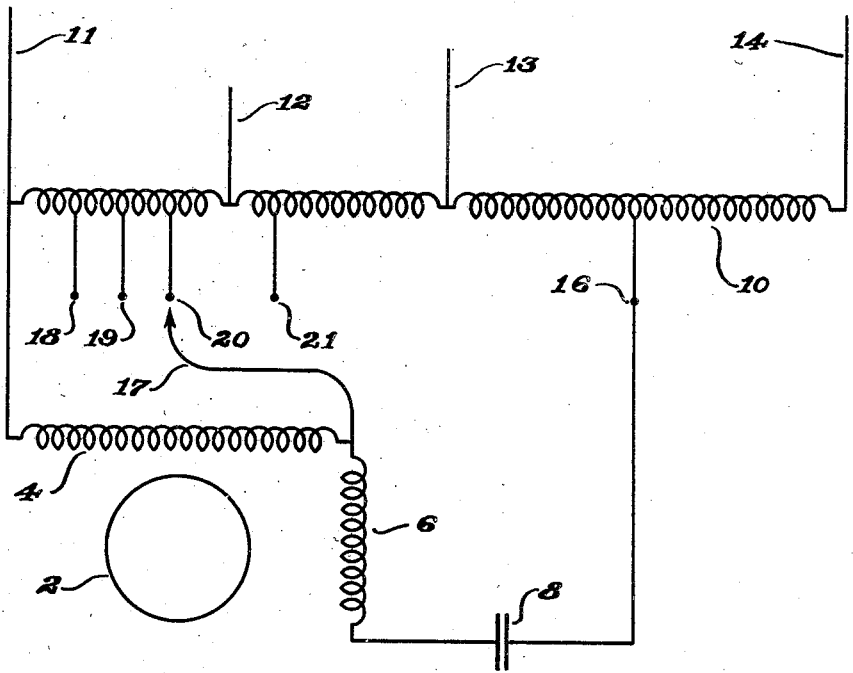

Patented May 8, 1934

1,958,104

UNITED STATES PATENT OFFICE 1,958,104

CONDENSER INDUCTION MOTOR

Carlton L. Kennedy, Braintree, Mass., assignor to The Holtzer-Cabot Electric Company, Roxbury, Mass., a corporation of Massachusetts Application November 8, 1930, Serial No. 494,388

5 Claims. (Cl. 172—233)

The present invention relates to condenser induction motors.

The object of the invention is to provide a multi-speed condenser induction motor having high starting torque on any of the different speed connections.

With this object in view, the principal feature of the present invention comprises a condenser induction motor having a main winding and a condenser circuit which includes a condenser winding and a condenser, together with means for varying the speed by impressing a variable voltage on the main winding, and simultaneously varying the impressed voltage on the condenser circuit inversely. By this means, as the voltage is reduced on the main winding to reduce the speed, the voltage on the condenser circuit is correspondingly increased so that a high starting torque is obtained under all conditions.

The accompanying drawing is a diagram of the preferred form of the invention.

The illustrated embodiment of the invention comprises an induction motor having a rotor 2, a main stator winding 4, and a condenser winding 6. The condenser winding is included in a condenser circuit which has a condenser 8. Voltages are impressed on the main winding and the condenser circuit by means of a voltage divider shown as an auto-transformer 10. The transformer is provided with line leads indicated as a common line lead 11 and three variable line leads 12, 13 and 14, which are used for different line voltages. Thus, for a motor rated for normal 110 volt operation, the leads 11 and 12 are used on 110 volt lines; for 220 volts, the leads 11 and 13 on 220 volt lines and the leads 11 and 14 on 440 volt lines, substantially identical operation resulting in any case.

The main winding is connected to the lead 11 and the main and condenser windings are connected together, as shown in the drawing. The space displacement between the windings is indicated in the drawing as being preferably about 90°. The condenser circuit is connected to the transformer, as indicated at 16, preferably at a point near the high voltage end thereof, in order that a considerable voltage may be impressed on the condenser circuit. A fairly high voltage on the condenser circuit is usually desirable because it permits use of a condenser of a small capacity. A variable lead 17 is connected to the junction of the main and condenser windings and is adapted to be connected at variable taps on the transformer. Four of such taps are illustrated at 18, 19, 20 and 21, for impressing variable voltages on the main winding. When the lead 17 is connected to the lowest tap 18, a low voltage is impressed on the main winding and the motor operates with a considerable slip. The taps 19 and 20 are also designed to impress less than line voltage on the main winding and the tap 21 is arranged to impress a voltage slightly in excess of the line voltage, it being assumed that 110 volt lines are connected to the leads 11 and 12.

The connections are such that a substantially constant voltage is impressed on the main winding and condenser circuit in series, the variable lead 17 being employed to vary the division of voltages impressed on the main winding and the condenser circuit.

It will be seen that as the voltage on the main winding is varied, the voltage on the condenser circuit is varied inversely, that is, a reduction of main winding voltage is accompanied by an increase in voltage on the condenser circuit. The slip of the motor depends primarily upon the main winding voltage and hence, the position of the lead 17 determines the speed at which the motor operates. The starting torque, however, depends primarily upon the product of the ampere turns of the two windings. Therefore, except for the provision for increasing the impressed voltage on the condenser circuit, the reduction of voltage on the main winding by the placing of the lead 17 on one of the low taps would result in a considerable diminution of the starting torque, as compared with the starting torque obtainable on the high speed connection. However, the reduction of the ampere turns of the main winding occasioned by the decrease in voltage impressed on it is compensated by the increase in the voltage applied to the condenser circuit so that a high starting torque for all connections can be maintained. In other words, a more nearly uniform starting torque is obtainable for the different connections. Inasmuch as the size of the condenser must be determined to give the necessary starting torque on the low speed connection, it will be seen that the present invention provides for the use of a condenser of minimum capacity.

The present invention also provides a further advantage which becomes apparent under running conditions. Since the main and condenser windings are actually in series, the current in the lead 17 is the vector difference between the current in the main winding and the current in the condenser winding. Under light loads, the condenser current, being primarily limited by the reactance of the condenser, is nearly 90° out of phase with the main winding current. However, as the load increases, the apparent reactance of the condenser winding also increases because of the voltage induced in it by transformer action through the rotation of the rotor. This increase in the apparent reactance partially compensates the capacitive reactance of the condenser and therefore the condenser current swings more nearly into phase with the main winding current. Hence the vector difference between the main winding current and the condenser current actually becomes smaller than the main winding current itself. In other words, at times of heaviest load, the transformer is not called upon to furnish full load current through the lead 17, and may therefore be economically designed to carry considerably less than full load current.

Having thus described the invention, what is claimed is:

1. A condenser induction motor having, in combination, a main winding, a condenser circuit including a condenser winding displaced from the main winding and a condenser, means for impressing a substantially constant voltage on the main winding and the condenser circuit in series, and means for regulating the division of voltage between the main winding and the condenser circuit to vary the speed.

2. A condenser induction motor having, in combination, a main winding, a condenser circuit including a condenser winding displaced from the main winding and a condenser, the main winding and the condenser circuit being connected together, means for impressing a substantially constant voltage on the main winding and condenser circuit in series including a transformer having a plurality of variable taps, a lead connecting with the junction of the main winding and the condenser circuit and adapted to be connected with one of the taps to impress a variable voltage on the main winding and to compensate for the variation in starting torque thus produced by an inverse variation in the voltage impressed on the condenser circuit.

3. An induction motor having, in combination, a main winding, an auxiliary circuit including an auxiliary winding separate and displaced from the main winding, the main winding and the auxiliary circuit being connected in series, means for impressing a substantially constant voltage on the main winding and the auxiliary circuit, and means for regulating the division of voltage between the main winding and the auxiliary circuit to vary the speed.

4. A variable speed motor having main and starting windings, phase modifying means included in the starting winding circuit, a transformer winding having end terminals and a plurality of intermediate taps through which the motor is supplied, one end of the main winding being connected to one end terminal of said transformer winding, and one end of the starting winding circuit being connected to the opposite end terminal of said transformer winding, and switching means for simultaneously connecting both the other end of the main and starting winding circuits to any one of the intermediate transformer taps to vary the speed of the motor.

5. A variable speed single phase motor having main and starting windings, phase modifying means included in the starting winding circuit, a single phase auto-transformer through which said motor is supplied having a plurality of taps intermediate its ends, a switch between a common connection to one end of both the main and starting winding circuits and said transformer for connecting the common connection to any one of said taps to vary the speed of the motor, the other ends of said main and starting winding circuits being connected to the opposite ends of said transformer.

CARLTON L. KENNEDY.